ര

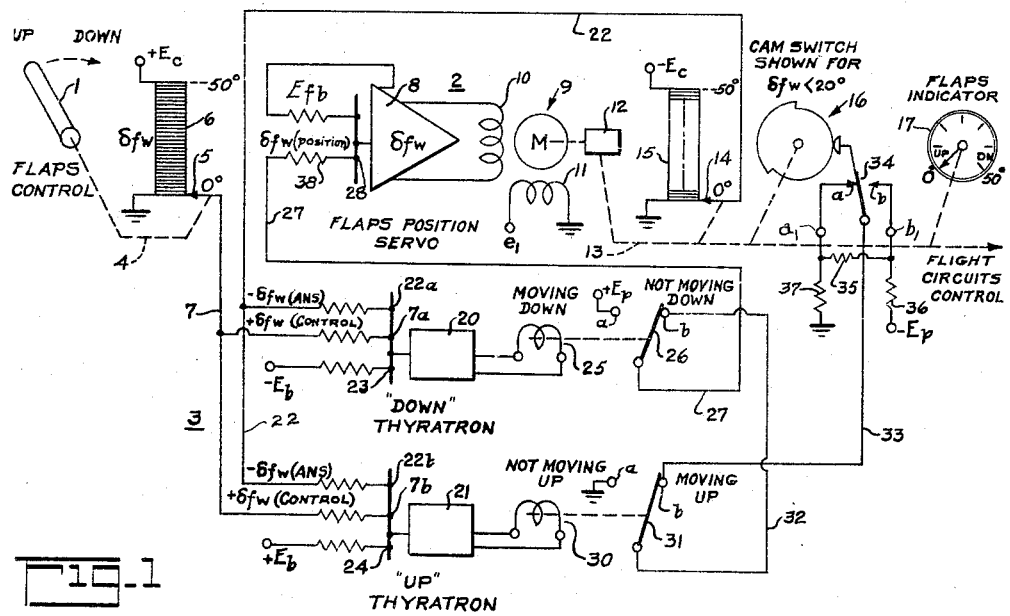
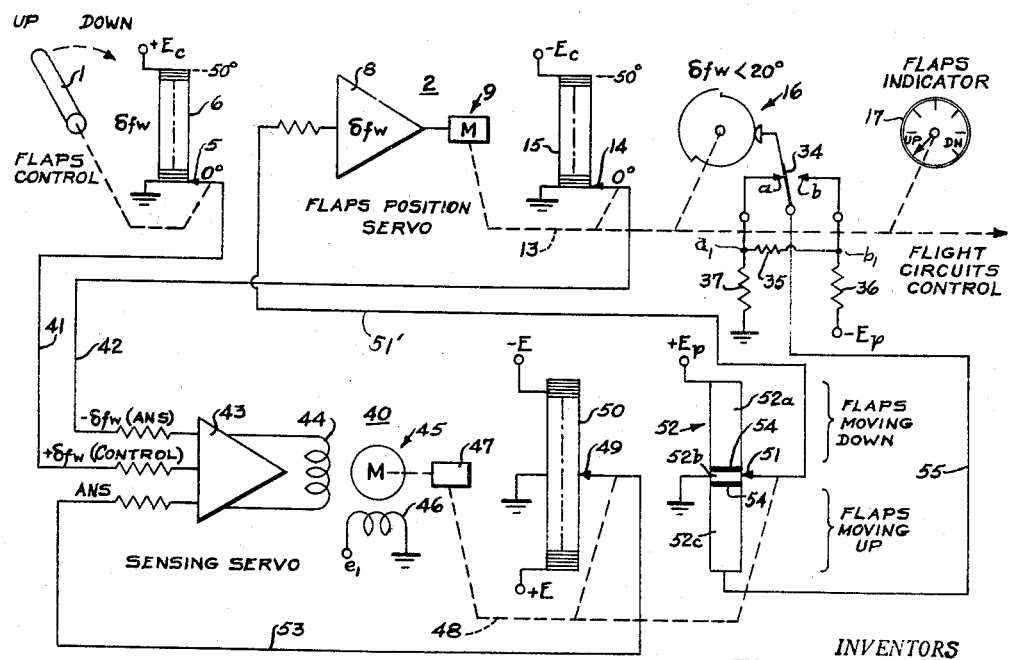

United States Patent Office 2,926,430
Patented Mar. 1, 1960

2,926,430

SIMULATED WING FLAPS CONTROL SYSTEM

Robert G. Stern, West Caldwell, and Charles E. Theobald, Jr., Fairlawn, N.J., assignors to Curtiss-Wright Corporation, a corporation of Delaware Application April 21, 1955, Serial No. 502,790

7 Claims. (Cl. 35—12)

This invention relates to aircraft training apparatus, and in particular to apparatus for simulating variable rate operation of an airplane's wing flaps and for indicating such operation.

In certain multiple engine commercial type aircraft, operation of the wing flaps is automatically controlled by servo motors or the like, so that the flaps are fully lowered at constant speed, say within 16 seconds, and are fully retracted at variable speed, say within 23 seconds. During final retraction, as through a deflection angle of 20° or less, the rate is comparatively low for reasons of safety in order to enable the pilot to increase airspeed for example, to compensate for loss of lift. It will therefore be apparent that simulation of proper control of the wing flaps in relation to the operation of the aircraft is very important in the training of aircraft personnel for the operation of large multiple engine aircraft.

Simulation of wing flaps operation in ground-based aircraft training apparatus has heretofore been proposed; however such simulation has been comparatively simple and straightforward, involving merely movement of the wing flaps between the "down" and "up" (i.e. retracted) positions.

In accordance with the present invention simulation of more involved flaps operation is realistically obtained by providing in combination with servo circuitry, sensing means jointly controlled respectively by the pilot's flaps control handle and servo apparatus or the like representing the instantaneous angular position of the flaps so as to control the rate of flaps deflection, depending on whether the flaps are moving "down" or "up" at a given time and also on the flaps deflection angle.

Referring to the drawings, Fig. 1 is a diagrammatic illustration of a wing flaps simulating system embodying the present invention employing thyratrons for the sensing means, and Fig. 2 is a diagrammatic illustration of another form of the invention showing servo sensing means.

The invention will be more fully set forth in the following description referring to the accompanying drawings, and the features of novelty will be pointed out with particularity in the claims annexed to and forming a part of this specification.

Referring specifically to Fig. 1, the wing flaps simulating system comprises essentially a simulated flaps control handle 1 operable by the pilot to represent the flaps deflection angle called for, a servo system or the like generally indicated at 2 for representing the instantaneous deflection of the wing flaps and a sensing system generally indicated at 3 for controlling the flaps position servo 2 according to the called-for direction of flaps deflection and also the deflection angle.

The pilot's flaps control handle 1 is operatively connected as indicated at 4 to the slider contact 5 of a wound-card type potentiometer 6 that is energized at its upper terminal by an A.C. control voltage $+E_c$ (phased with respect to a reference A.C. voltage) and grounded at its lower terminal, thus to represent the range of movement of the flaps between 50° (flaps fully down) and 0° (flaps fully retracted). Accordingly, the derived voltage at the slider contact 5 represents the wing flaps deflection ($\delta_{fw}$) called for by the pilot. This derived voltage is fed by conductor 7 to the sensing system 3 as hereinafter described.

The flaps deflection or position system 2 comprises servo motor apparatus including a servo summing amplifier 8 of well-known design and a reversible two-phase servo motor 9 having a control winding 10 energized by the output of the amplifier 8, and a reference winding 11 that is energized by the reference A.C. voltage $e_1$. The operation of this type of A.C. motor is well-known, the voltage in the control winding 10 being in quadrature with the reference voltage $e_1$ so that reversal of phase of the control voltage causes reversal in the direction of rotation of the motor. The input network of the summing amplifier 8 is energized as indicated by a stabilizing feedback voltage $E_{fb}$ and by a position voltage $E_p$ that is applied by the sensing system as hereinafter described for causing rotation of the servo motor in one direction to represent lowering of the flaps and in the opposite direction to represent retraction of the flaps. The output of the servo motor is suitably utilized by mechanical means including a gear reducer 12 and connections 13 to operate the slider 14 of a position potentiometer 15, a cam switch 16 and a flaps indicator 17. The potentiometer 15 is energized at its upper terminal by an A.C. control voltage $-E_c$ and is grounded at its lower terminal to represent the aforesaid flaps deflection range.

The wing flaps position servo 2 may control suitable computing circuits of flight simulating apparatus (not shown) not essential to the understanding of the present invention. For example, the output of the flaps position servo can be used to control other potentiometer circuits in the manner indicated in a copending application S.N. 436,532 filed June 14, 1954 by Stern et al. for "Flight Computing System," now Patent No. 2,858,623, and assigned to the same assignee as the present invention.

The sensing means 3 for controlling operation of the flaps position servo 2 comprises a pair of thyratrons or equivalent discharge apparatus, 20 and 21 respectively, each adapted to "fire" when the voltage on the control grid is positive. The "down" thyratron 20, as is also the "up" thyratron 21, is energized jointly by a pair of voltages representing respectively $+\delta_{fw}$, the flaps deflection called for (flaps control 1), and $-\delta_{fw}$ representing the instantaneous flaps position (position servo 2). The positive control voltage is fed to the input network terminals 7a and 7b of the thyratrons 20 and 21 respectively, and the negative position voltage is fed from the servo potentiometer 15, slider 14, over line 22 to the input network terminals 22a and 22b of the thyratrons 20 and 21 respectively. The input network of the thyratron 20 is also energized at terminal 23 by a small bias voltage $-E_b$ and the input network of the thyratron 21 is energized at its terminal 24 by a small bias voltage $+E_b$. Normally, in the stabilized condition of the system wherein the control voltages $+E_c$ and $-E_c$ balance each other, the thyratron 20 is "unfired" and the thyratron 21 is "fired." It will therefore be seen that the "firing" of either thyratron depends on the summed voltage at the corresponding network being positive with respect to the reference voltage.

The output of the two sensing thyratrons is utilized to control a pair of interconnected relays for in turn controlling application of different position voltages to the flaps position servo 2. The thyratron 20 when fired energizes a relay 25 for closing a switch 26 on its $a$ contact to represent the flaps as "moving down." This contact is connected to a source of position voltage $+E_p$. When the relay is de-energized the switch 26 engages its $b$ contact, representing the flaps as "not moving down." The relay switch 26 is connected by line 27 to the terminal 28 of the input network of the position servo amplifier 8.

The firing of thyratron 21 causes energization of the relay 30 and closing of the switch 31 on its grounded $a$ contact, this position representing the flaps as "not moving up." When the relay is de-energized the switch 31 is closed on its $b$ contact, this position representing the flaps as "moving up." The switch 31 is connected by line 32 to the $b$ contact of relay switch 26. The $b$ contact of the relay switch 31 is connected by line 33 to the movable contact 34 of the cam switch 16. This switch is cam operated by the position servo 2 so as to engage its $a$ contact when the flaps deflection angle is represented as less than 20° for example, and to engage its $b$ contact when the flaps deflection angle is greater than 20°. The $a$ and $b$ contacts are arranged to be connected to a source of position voltage $-E_p$ through a voltage dividing network consisting of resistances 35, 36 and 37. The lower terminal of resistance 36 is connected as indicated to the voltage source $-E_p$ and the contacts $a$ and $b$ derive voltages from the divider terminals $a_1$ and $b_1$. It will be apparent that the amount of position voltage $-E_p$ on the line 33—27 will be greater in the case where the cam switch engages its contact $b$ ($\delta_{fw}>20°$) than in the case where the switch engages its $a$ contact ($\delta_{fw}<20°$). It will also be apparent that the aforesaid resistance network can be suitably designed to provide for any desired voltage ratio for the above conditions.

The operation of the wing flaps simulated system is as follows: Let it be assumed that the flaps are in the fully retracted i.e. 0° position as indicated, and that the pilot desires fully to lower the flaps. Accordingly, he moves the flaps control handle 1 so as to position the slider 5 at the upper terminal of the control potentiometer 6, thereby impressing the full control voltage $+E_c$ on the line 7. A large positive voltage accordingly appears at both terminals 7$a$ and 7$b$ of the thyratrons 20 and 21 and, since the negative control voltage from the position servo potentiometer 15 is zero, both thyratrons will now be fired. It should be noted that the bias voltage $-E_b$ on the thyratron 20 is comparatively small so as to be counter-balanced by appreciable positive voltage from the flaps control potentiometer 6. With the two thyratrons "fired," the thyratron switch 26 closes on its $a$ contact to impress a position voltage $+E_p$ as above described on the input network of the servo amplifier 8. This voltage is phased with respect to the reference voltage so as to rotate the servo motor to cause upward movement of the slider 14 on the position servo card 15, thereby to impress increasingly greater negative voltage on the line 22. This movement represents lowering of the flaps. Since the thyratron 20 remains fired as long as its grid potential is positive, the position servo remains energized and tends to continue operation until the derived negative voltage from potentiometer 15 matches the positive control voltage from potentiometer 6; however, when this point is reached the resultant grid voltage at thyratron 20 is no longer positive as the bias voltage $-E_b$ now predominates and biases the grid negative. Accordingly, the thyratron 20 "unfires" or "cuts out," de-energizing its relay, so that the switch 26 engages its $b$ contact thereby to deenergize the servo by connecting the servo line 27 to ground. This circuit includes the switch 26, its $b$ contact, line 32, "up" thyratron switch 31 and its $a$ contact. It will be noted that the "up" thyratron 21 remains fired and functionally inactive throughout the above lowering operation; however it is effective to deenergize the position servo through its grounded $a$ contact when thyratron 20 "unfires" at whatever position the pilot indicates when he calls for lowering of the flaps, either partially or fully. It will be apparent that the above-described operation takes place when the pilot moves the slider 5 to indicate flaps movement from the retracted to any lowered intermediate position as in such case the position servo will "follow up" until the intermediate called-for deflection angle is reached at which time the "down" thyratron 20 will cut-out and the position servo will be deenergized.

It will now be assumed that the flaps are down, either fully or at a deflection angle greater than 20° and that the pilot desires fully to retract the flaps. The flaps control handle is such case is operated toward "up" to move the slider 5 of control potentiometer 6 toward the grounded terminal. Thus the derived positive control voltage at slider 5 is decreased to zero when the flaps control handle calls for full retraction. Accordingly, the negative control voltage $-E_c$ from the position servo potentiometer 15 predominates at the control grids of both thyratrons 20 and 21. Thyratron 21 now cuts out so that both thyratrons are "unfired" and neither can "fire." Hence both the relays 25 and 30 are deenergized with the respective switches 26 and 31 in the positions illustrated to connect the position voltage $-E_p$ to the line 27 of the position servo input network. Since in the assumed case, the original flaps deflection angle was greater than 20° the servo cam switch 16 is positioned so that the switch 34 engages its $b$ contact; hence the position voltage $-E_p$ is connected to the servo input network through a circuit including the resistance 36, switch 34 ($b$ contact), line 33, relay switches 31 and 26, and the input network line 27. The resistance 36 is suitably selected in combination with the input network resistance 38 so that the servo motor 9 rotates at a predetermined speed.

When the flaps deflection angle has been decreased to 20°, the cam switch 16 causes the switch contact 34 to engage its $a$ contact as illustrated so that the position voltage circuit now includes an additional resistance 35 as previously described. The added resistance now in the circuit causes the position servo to rotate at slower speed so that the flaps are represented as retracted through the final 20° range slowly as in practice. As the derived negative control voltage $-E_c$ at slider 14 of the servo potentiometer 15 nears zero, the voltages at the input terminals 22$b$ and 7$b$ of the "up" thyratron 21 tend to cancel each other so that the bias voltage $+E_b$ at terminal 24 predominates to "fire" the thyratron. This causes switch 31 to ground at its $a$ contact the input servo line 27 to deenergize the servo. The "down" thyratron 20 of course remains unfired due to its bias voltage $-E_b$ at terminal 23 so that the aforesaid ground circuit is completed through the switch 26.

It will be apparent that the operation above described obtains where the pilot moves the flaps control handle from "down" to some intermediate or partially retracted position, the rate of flaps movement in this case depending on whether the desired flaps angle is greater or less than 20°. It will also be apparent that with the flaps control handle in an intermediate position and the position servo stabilized at the indicated flaps angle, a called-for raising or lowering of the flaps from said intermediate position causes either firing of the "down" thyratron 20 where lowering is called for, or unfiring the "up" thyratron 21 where retraction is called for.

The system illustrated in Fig. 2 operates essentially the same as the system in Fig. 1 except that the sensing means comprises a servo system 40 for controlling the energization of the flaps position servo 2. The flaps control potentiometer 6, the flaps position servo 2 and control potentiometer 15, and the cam switch 16 and its associated resistance circuits are similar to the corresponding apparatus of Fig. 1. The control voltage $+E_c$ from the potentiometer 6 and the answer control voltage $-E_c$ from the servo potentiometer 15 are fed by lines 41 and 42 respectively to the summing amplifier 43 of the sensing servo. The resultant output of the amplifier energizes the control winding 44 of the two-phase servo motor 45 having the usual reference winding 46 energized by the quadrature reference voltage $e_1$. The output of the motor is suitably connected through a speed reducing gearing 47 and connections indicated at 48 to the slider 49 of a conventional "answer" potentiometer 50 and to the slider contact 51 of a switch card 52. The answer slider 49 is connected by line 53 to the input network of the servo amplifier 43 for position control of the sensing servo motor according to well-known practice, and switch slider 51 connects by line 51' to the servo 2.

The switch card 52 comprises three conducting sections 52a and 52c and a mid-section 52b, the latter being grounded as indicated and insulated at 54 from the other sections. The section 52a is connected to the position voltage $+E_p$ and the lower section 52c is connected by line 55 to the cam controlled switch 34 and to the other position voltage $-E_p$.

Accordingly it will be apparent that as the movement sensing servo 40 is operated in one direction or the other, depending on whether the negative control voltage $-E_c$ from the position potentiometer 15, or the positive control voltage $+E_c$ from the control potentiometer 6, predominates at the input network, the slider 51 of the switch card is positioned to energize the position servo either by positive or negative position voltages for operating the servo in the same manner as described in Fig. 1. When the control voltages are balanced at the sensing servo input so that the amplifier output is zero, the servo automatically centers itself by means of the derived voltage from its "answer" potentiometer 50; thus the slider 51 of the switch card is centered and grounded through the conducting portion 52b, thereby deenergizing the position servo 2. As in the case of Fig. 1, an initial movement of the flaps control handle calling for a change in flaps position causes an unbalance in either the positive or negative sense at the sensing servo to cause in turn the flaps position servo to be selectively operated by one of the position voltages $+E_p$ and $-E_p$.

It should be understood that this invention is not limited to specific details of construction and arrangement thereof herein illustrated, and that changes and modifications may occur to one skilled in the art without departing from the spirit and the invention.

What is claimed is:

1. Training apparatus for simulating variable rate wing flaps operation comprising a simulated flaps control including adjustable electrical means operable by a pilot to derive a control voltage representing called-for flaps deflection, electric servo means adapted to be positioned in follow-up operation of the flaps control according to the assumed flaps deflection angle for deriving another control voltage representing said angle, direction sensing means responsive jointly to said control voltages, and circuitry controlled by said sensing means for energizing or deenergizing said servo means in direction and extent according to the sense and magnitude of called-for change in the flaps deflection angle, said circuitry having alternate energizing circuits, one of which is arranged to cause operation of said servo means at a slower rate during simulated retraction of wing flaps.

2. Training apparatus for simulating variable rate wing flaps operation comprising a simulated flaps control including adjustable voltage deriving means operable by a pilot to represent called-for flaps deflection, electric servo means including other voltage deriving means adapted to be positioned in follow-up operation of the flaps control according to the assumed flaps deflection angle, direction sensing means responsive jointly to the aforesaid voltage deriving means, and circuitry controlled jointly by said sensing means and said servo means for energizing or deenergizing said servo means in direction and extent according to the sense and magnitude of called-for change in the flaps deflection angle, said circuitry including alternate energizing circuits and voltage sources of opposite sense arranged for selective and variable-rate operation of said servo means, one of said circuits being controlled by said sensing means whereby simulated retraction of flaps through the final stage is at a comparatively slow rate.

3. Training apparatus for simulating variable rate wing flaps operation comprising a simulated flaps -up -down control including adjustable voltage deriving means operable by a pilot to represent called-for flaps deflection, electric servo means including other voltage deriving means adapted to be positioned to represent the assumed flaps deflection angle and a flaps indicator controlled by said servo means, direction sensing means including a pair of thyratrons each responsive jointly to respective voltages from said flaps control and servo deriving means, and switching means controlled by said thyratrons for selectively connecting said electro servo means to operating voltages of opposite sense for operating said servo means and positioning the flaps indicator in direction and extent corresponding to the sense and magnitude of movement of the flaps control representing called-for change in the flaps deflection angle.

4. Training apparatus for simulating variable rate wing flaps operation comprising a simulated flaps -up -down control including adjustable voltage deriving means operable by a pilot to represent called-for flaps deflection, electric servo means including other voltage deriving means adapted to be positioned to represent the assumed flaps deflection angle and a flaps indicator controlled by said servo means, the voltages from said flaps control and servo deriving means respectively being of opposite sense, direction sensing means including a pair of thyratrons each responsive jointly to said voltages of opposite sense, said thyratrons also each responsive to respective biasing voltages, and switching means jointly controlled by said thyratrons for selectively connecting said servo means to operating voltages of opposite sense for operating said servo means and positioning the flaps indicator in direction and extent according to the sense and magnitude of movement of the flaps control representing called-for change in the flaps deflection angle.

5. Training apparatus for simulating variable rate wing flaps operation comprising a simulated flaps -up -down control including adjustable voltage deriving means operable from a first position by a pilot to represent called-for flaps deflection from said position, electric servo means including other voltage deriving means adapted to be positioned to represent the assumed flaps deflection angle and a flaps indicator controlled by said servo means, the voltages from said deriving means respectively varying in magnitude only and being of opposite sense, direction sensing means including a second electric servo means of the self-positioning type responsive jointly to said voltages of opposite sense to determine whether the flaps movement direction is up or down from said first position, and circuit controlling means controlled by said sensing servo means for selectively connecting said first servo means to operating voltages of opposite sense for operating said first servo means and positioning the flaps indicator in direction and extent according to the sense and magnitude of called-for change in the flaps deflection angle.

6. Training apparatus for simulating wing flaps variable rate operation comprising means including a simulated flaps control operable by a pilot to derive a control quantity representing called-for flaps deflection, servo means adapted to be positioned in follow-up operation of said flaps control for deriving another control quantity according to the assumed flaps deflection angle, means responsive jointly to the aforesaid control quantities for sensing the direction of the called-for flaps deflection, circuit controlling means responsive to said sensing means for in turn controlling the operation of said servo means, said circuit controlling means being arranged to cause operation of said servo means selectively in opposite directions representing "flaps moving up" and "flaps moving down" respectively, and means controlled by said servo means operable when the flaps position is represented at about 20° and the servo is operating in a "flap moving up" direction to cause decrease in speed in operation of said servo means to simulate reduced rate of flaps retraction from said 20° position.

7. Training apparatus for simulating variable rate wing flaps operation comprising means including a simulated flaps -up -down control operable from a first position by a pilot for deriving a signal to represent called-for flaps up or down deflection from said position, follow-up servo means adapted to be positioned for deriving a second signal to represent the assumed flaps deflection angle and a flaps indicator controlled by said servo means, direction sensing means operable according to the instantaneous difference in said signals to determine whether the flaps movement direction is up or down from said first position, said sensing means constituting an electrical system in addition to said servo means, and means controlled by said sensing means difference signals for operating said servo means and positioning the flaps indicator in direction and extent corresponding to the sense and magnitude of called-for change in the flaps deflection angle.

References Cited in the file of this patent

UNITED STATES PATENTS

| | | |
|---|---|---|
| 2,395,477 | Gumley | Feb. 26, 1946 |
| 2,475,355 | Kail | July 5, 1949 |
| 2,499,597 | Lukacs | Mar. 7, 1950 |
| 2,516,803 | Rippere | July 25, 1950 |
| 2,519,698 | Pearsall | Aug. 22, 1950 |
| 2,579,648 | Chudyk | Dec. 25, 1951 |
| 2,628,434 | Dehmel | Feb. 17, 1953 |
| 2,731,737 | Stern | Jan. 24, 1956 |
| 2,842,867 | Dehmel | July 15, 1958 |